(12) United States Patent
Chen et al.

(10) Patent No.: US 11,853,720 B2
(45) Date of Patent: Dec. 26, 2023

(54) VACUUM FLUCTUATION QUANTUM RANDOM NUMBER GENERATOR CHIP BASED ON PHOTONIC INTEGRATION TECHNOLOGY

(71) Applicant: SHRONG ENERGY TECHNOLOGY CO., LTD., Beijing (CN)

(72) Inventors: Qiechun Chen, Beijing (CN); Zhiguo Yang, Beijing (CN)

(73) Assignee: SHRONG ENERGY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/781,582

(22) PCT Filed: Jun. 1, 2021

(86) PCT No.: PCT/CN2021/097778
§ 371 (c)(1),
(2) Date: Jun. 1, 2022

(87) PCT Pub. No.: WO2022/028078
PCT Pub. Date: Feb. 10, 2022

(65) Prior Publication Data
US 2023/0004355 A1 Jan. 5, 2023

(30) Foreign Application Priority Data
Aug. 6, 2020 (CN) .......................... 202010783534.1

(51) Int. Cl.
*G06F 7/58* (2006.01)
*G02B 6/42* (2006.01)
(52) U.S. Cl.
CPC ........... *G06F 7/582* (2013.01); *G02B 6/4215* (2013.01); *G02B 6/4268* (2013.01)

(58) Field of Classification Search
CPC ..... G06F 7/582; G02B 6/4215; G02B 6/4268; G02B 6/4269; G02B 6/4296; G02B 6/4244; G02B 6/4245
See application file for complete search history.

(56) References Cited

U.S. PATENT DOCUMENTS 6,807,204 B1 * 10/2004 O'Dowd ............... H01S 5/0687
372/28
10,411,823 B2   9/2019 Otsubo
(Continued)

FOREIGN PATENT DOCUMENTS

CN   108536424 A   9/2018
CN   108777430 A   11/2018
(Continued)

OTHER PUBLICATIONS

The World Intellectual Property Organization (WIPO) International Search Report for PCT/CN2021/097778 dated Sep. 2, 2021 4 Pages (with translation).

(Continued)

*Primary Examiner* — Georgia Y Epps
*Assistant Examiner* — Don J Williams
(74) *Attorney, Agent, or Firm* — ANOVA LAW GROUP, PLLC

(57) ABSTRACT

A vacuum fluctuation quantum random number generator chip includes a heat sink substrate, a laser fixed to a first end of the heat sink substrate, at least two photoelectric detectors fixed to a second end of the heat sink substrate, and a beam splitter fixed to the heat sink substrate and located between the laser and the at least two photoelectric detectors. Light of the laser propagates through the beam splitter. The at least two photoelectric detectors are respectively positioned at optical path outlets of the beam splitter.

4 Claims, 1 Drawing Sheet

(56) References Cited

U.S. PATENT DOCUMENTS

| | | | | |
|---|---|---|---|---|
| 2010/0259760 | A1* | 10/2010 | Karrai | ........... G01B 11/002 356/496 |
| 2016/0047643 | A1 | 2/2016 | Yuan et al. | |
| 2019/0220250 | A1 | 7/2019 | Shi et al. | |
| 2022/0308839 | A1 | 9/2022 | Luo et al. | |

FOREIGN PATENT DOCUMENTS

| | | |
|---|---|---|
| CN | 209297284 U | 8/2019 |
| CN | 111488993 A | 8/2020 |
| CN | 111708514 A | 9/2020 |
| JP | 2000268396 A | 9/2000 |
| JP | 2009070009 A | 4/2009 |
| JP | 2017021074 A | 1/2017 |
| JP | 2018194648 A | 12/2018 |
| JP | 2022550789 A | 12/2022 |

OTHER PUBLICATIONS

Japan Patent Office (JPO) The Office Action For JP Application No. 2022-538455 dated Aug. 1, 2023 9 Pages (Translation Included).

* cited by examiner

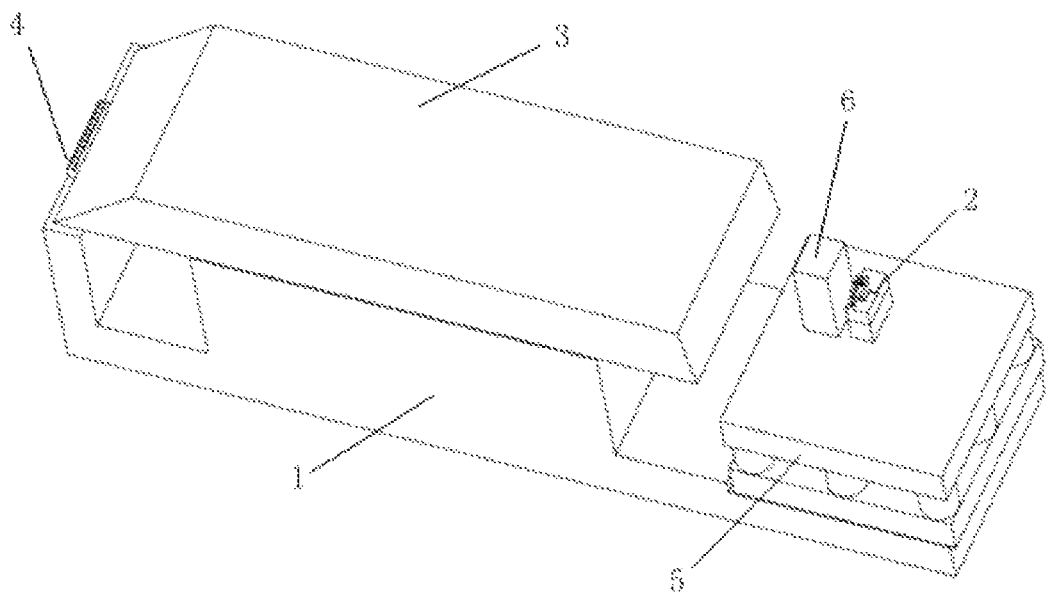

VACUUM FLUCTUATION QUANTUM RANDOM NUMBER GENERATOR CHIP BASED ON PHOTONIC INTEGRATION TECHNOLOGY

CROSS-REFERENCE TO RELATED APPLICATIONS

The present application is a national stage entry under 35 U.S.C. § 371 of International Application No. PCT/CN2021/097778, filed on Jun. 1, 2021, which claims the priority to Chinese Patent Application No. 202010783534.1, filed with the China National Intellectual Property Administration (CNIPA) on Aug. 6, 2020, and entitled "VACUUM FLUCTUATION QUANTUM RANDOM NUMBER GENERATOR CHIP BASED ON PHOTONIC INTEGRATION TECHNOLOGY," which are incorporated herein by reference in their entirety.

TECHNICAL Field

The present disclosure relates to, but is not limited to, a vacuum fluctuation quantum random number generator chip based on a photonic integration technology.

BACKGROUND

A basic principle of a quantum vacuum fluctuation technology is that: in quantum optics, quadrature components of an amplitude and a phase of a vacuum state in a phase space cannot be precisely detected simultaneously. A quantum random number generator (QRNG) is mainly applied in fields such as quantum encryption, quantum communication, and fiber optic communication, but is not limited to these fields.

In a conventional optical structure, components such as a fiber beam splitter, a laser, and a detector are separately encapsulated, and a fiber connection is used between the components. On the one hand, each discrete component is large in volume, and a bending radius of an optical fiber is large. As a result, the device is large in volume, pin specifications of the components are not the same, and a layout thereof is complex. In use, the components need to be manually welded to a printed circuit board. On the other hand, the optical fiber is prone to break and is difficult to install and use. In addition, the optical fiber is susceptible to an ambient temperature and vibration, causing a degradation of product performance.

The laser has a large volume and an optical fiber with a large turning radius. In use, the optical fiber is likely to change in refractive index due to vibration and a temperature, causing a change in optical intensity. In addition, a driving circuit of the laser is complex, requiring high power consumption for independent temperature control, and the driving circuit is large in overall volume. A process of the fiber beam splitter itself may also cause unequal beam splitting ratio of optical intensity. In order to adjust the beam splitting ratio of the fiber beam splitter, an attenuator is usually added. However, the attenuator requires high voltage accuracy and is difficult to make. Consequently, a difficult of circuit design is greatly increased. Consequently, in the conventional optical structure, the optical fiber is susceptible to an external temperature and vibration, which causes an overall change of an optical system. In a conventional solution, a quantum random number generator device is susceptible to interference of an external environment, and the system is very unstable overall.

SUMMARY

An overview of the subject matter detailed in the present disclosure is provided below, which is not intended to limit the protection scope of the claims.

The present disclosure aims to provide a vacuum fluctuation quantum random number generator chip with a laser, a beam splitter, and photodetectors integrated as a whole.

The present disclosure provides a quantum vacuum fluctuation quantum random number generator chip based on a photonic integration technology, including a heat sink substrate, a laser, a beam splitter, and at least two photoelectric detectors; wherein the laser is fixed to a first end of the heat sink substrate, the at least two photoelectric detectors are fixed to a second end of the heat sink substrate, the beam splitter is fixed to the heat sink substrate and is located between the laser and the detectors, laser light of the laser propagates through the beam splitter, and the at least two photoelectric detectors are respectively positioned at optical path outlets of the beam splitter.

The vacuum fluctuation quantum random number generator chip further includes a semiconductor cooler, the semiconductor cooler is fixed to the first end of the heat sink substrate, and the laser is fixed to the semiconductor cooler.

The vacuum fluctuation quantum random number generator chip further includes a lens, and the lens is located between a light ray outlet of the laser and an optical path inlet of the beam splitter.

The beam splitter is a Y-waveguide beam splitter, for example, a PLC optical waveguide.

The laser is, but is not limited to, a DFB laser.

An emission end of the beam splitter is a bevel structure having an angle less than 90°.

A quantity of the photoelectric detectors is equal to a quantity of outlet ports of the beam splitter.

In this embodiment of the present disclosure, the high-speed quantum random number generator based on a vacuum fluctuation technology can achieve the following beneficial effects:

In the present disclosure, by using a photonic integration technology, the laser, the beam splitter, and the photoelectric detectors are coupled and then fixed on the heat sink base for encapsulation. This greatly reduces a product volume, reduces disadvantages caused by application of an optical fiber and performance of the optical fiber, and improves product performance and a service life. In addition, pin specifications of encapsulated products are the same, so that mounting on a printed circuit board can be implemented directly by using a machine.

BRIEF DESCRIPTION OF THE DRAWINGS

The drawings incorporated into the specification and constituting part of the specification illustrate the embodiments of the present disclosure, and are used together with the description to explain the principles of the embodiments of the present disclosure. In these drawings, similar reference numerals are used to represent similar elements. The drawings in the following description are part rather than all of the embodiments of the present disclosure. Persons of ordinary skill in the art may obtain other drawings based on these drawings without creative efforts.

FIG. 1 exemplifies a schematic diagram of a structure of a vacuum fluctuation QRNG chip according to the present disclosure.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by those of ordinary skill in the art based on the embodiments of the present disclosure without creative efforts should fall within the protection scope of the present disclosure. It should be noted that without conflict, the embodiments in this application and features in the embodiments may be combined with each other.

In a conventional technology, a laser, a beam splitter, and a photoelectric detector are discrete components and are separately encapsulated. An active component is connected to a passive component via an optical fiber. A product is large in overall volume, and the optical fiber is vulnerable to damage. By using a photonic integration technology, the inventor integrates active components such as the laser, the beam splitter, and the photoelectric detector and a passive component into one chip by coupling or based on another method for encapsulation. This greatly reduces a product volume, reduces disadvantages caused by application of an optical fiber and performance of the optical fiber, and improves product performance and a service life. In addition, pin specifications of encapsulated products are the same, so that mounting on a printed circuit board can be implemented directly by using a machine.

With reference to the accompanying drawings, the following describes in detail a vacuum fluctuation QRNG chip based on a photonic integration technology provided in the present disclosure.

FIG. 1 shows a schematic diagram of a structure of a vacuum fluctuation QRNG chip according to the present disclosure. Referring to FIG. 1, the vacuum fluctuation QRNG chip includes a heat sink substrate 1, a laser 2, a beam splitter 3, and at least two photoelectric detectors 4. The laser 2 is fixed to a first end of the heat sink substrate 1, and serves as a light source of the QRNG. The at least two photoelectric detectors 4 are fixed to a second end of the heat sink substrate 1, and are configured to detect strength of each optical signal sent by the beam splitter 3, and separately convert each optical signal into an electrical signal for output. The beam splitter 3 is fixed to the middle of the heat sink substrate 1, and is configured to divide an optical signal emitted by the two laser 2 into at least two optical signals and output the optical signals.

Specifically, light of the laser 2 enters the beam splitter 3, and the at least two photoelectric detectors 4 are respectively positioned at optical path outlets of the beam splitter 3.

A quantity of photoelectric detectors 4 is equal to a quantity of optical paths that need to be detected at an outlet of the beam splitter 3. For example, when the beam splitter 3 is a two-way optical beam splitter, two photoelectric detectors 4 are correspondingly disposed.

In an optional embodiment, the vacuum fluctuation QRNG chip further includes a semiconductor cooler 5, configured to control a temperature of the laser 2, so as to ensure stability of emergent light of the laser 2 and a service life of the laser 2. Specifically, the semiconductor cooler 5 is fixed to the first end of the heat sink substrate 1, and the laser 2 is fixed to the semiconductor cooler 5.

In an optional embodiment, the vacuum fluctuation QRNG chip further includes a lens 6. The lens 6 is located between a light ray outlet of the laser 2 and an optical path inlet of the beam splitter 3, and is configured to aggregate a beam emitted by the laser 2 into the optical path inlet of the beam splitter 3, so as to improve optical conductivity. Specifically, both the lens 6 and the laser 2 are disposed on the semiconductor cooler 5, or may be directly disposed on the heat sink substrate 1.

In a technical solution of this disclosure, the beam splitter 3 may be a one-division multiway beam splitter, or may be an N-division multiway beam splitter, where N is a natural number greater than 1.

In a typical embodiment, the beam splitter 3 is a Y-waveguide beam splitter, for example, a PLC optical waveguide beam splitter, including one optical path inlet and two optical path outlets. Correspondingly, the vacuum fluctuation QRNG chip includes two photoelectric detectors 4, and is respectively located at the two optical path outlets of the beam splitter 3. A laser beam emitted by the laser 2 enters from the optical path inlet of the beam splitter 3, and is divided into two beams and then emitted from the two optical path outlets to the two photoelectric detectors 4. For example, the beam splitter 3 may be an equal-ratio optical beam splitter, that is, a split ratio is 50%:50%, or may be an unequal-ratio optical beam splitter, for example, a split ratio may be 40%:60%.

In a specific embodiment, an emission end of the beam splitter 3 is a bevel structure having an angle less than 90°. After each split beam is reflected through the bevel, a beam direction rotates and the beam is irradiated on the photoelectric detector 4. In another embodiment, an emission end of the beam splitter 3 may alternatively be a bevel structure at another angle or a vertical plane structure, and it only needs to be ensured that emergent light is accurately received by the photoelectric detector 4.

In the vacuum fluctuation QRNG chip in the present disclosure, the laser 2, the beam splitter 3, and the photoelectric detectors 4 each are integrated on the heat sink base 1 through a photonic integration technology, so that an optical chip laser 1 and the waveguide component beam splitter 3 are integrated by coupling. Therefore, not only an optical fiber connection is not required, but also an integrated chip encapsulated as a whole is small in volume and light in weight. In addition, pin specifications are the same, so that mounting on a printed circuit board can be implemented directly by using a machine. This greatly improves product durability and ease of use.

The vacuum fluctuation QRNG chip based on a photonic integration technology in this embodiment of the present disclosure can achieve the following beneficial effects:

In the present disclosure, through a photonic integration technology, the laser, the beam splitter, and the photoelectric detectors are coupled and then fixed on the heat sink base for encapsulation. This greatly reduces a product volume, reduces disadvantages caused by application of an optical fiber and performance of the optical fiber, and improves product performance and a service life. In addition, pin specifications of encapsulated products are the same, so that mounting on a printed circuit board can be implemented directly by using a machine.

In the present disclosure, the terms "include," "comprise," or any other variations thereof are intended to cover a non-exclusive inclusion, so that an article or a device including a series of elements not only includes those elements, but also includes other elements that are not explicitly listed, or also includes inherent elements of the article or the device. Without more restrictions, the elements defined by the statement "including a . . . " do not exclude the existence of other identical elements in the article or device including the elements.

Those skilled in the art can easily think of other implementation solutions of the present disclosure after considering the specification and practicing the disclosure herein. This application is intended to cover any variations, purposes or adaptive changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the appended claims.

It should be noted that, the present disclosure is not limited to the precise structures that have been described above and shown in the accompanying drawings, and can be modified and changed in many ways without departing from the scope of the present disclosure. The scope of the present disclosure is defined by the appended claims.

INDUSTRIAL APPLICABILITY

The present disclosure provides a vacuum fluctuation QRNG chip based on a photonic integration technology. By using a photonic integration technology, a laser, a beam splitter, and photoelectric detectors are coupled and then fixed on a heat sink base for encapsulation. This greatly reduces a product volume, reduces disadvantages caused by application of an optical fiber and performance of the optical fiber, and improves product performance and a service life. In addition, pin specifications of encapsulated products are the same, so that mounting on a printed circuit board can be implemented directly by using a machine.

The invention claimed is:

1. A vacuum fluctuation quantum random number generator chip comprising:
   a heat sink substrate;
   a laser fixed to a first end of the heat sink substrate;
   at least two photoelectric detectors fixed to a second end of the heat sink substrate; and
   a beam splitter fixed to the heat sink substrate and located between the laser and the at least two photoelectric detectors;
   wherein:
      light of the laser propagates through the beam splitter;
      the at least two photoelectric detectors are respectively positioned at optical path outlets of the beam splitter; and
      an emission end of the beam splitter includes a bevel structure having an angle less than 90°.

2. The vacuum fluctuation quantum random number generator chip according to claim 1, further comprising:
   a semiconductor cooler fixed to the first end of the heat sink substrate;
   wherein the laser is fixed to the semiconductor cooler.

3. The vacuum fluctuation quantum random number generator chip according to claim 1, further comprising:
   a lens located between a light ray outlet of the laser and an optical path inlet of the beam splitter.

4. The vacuum fluctuation quantum random number generator chip according to claim 1, wherein the beam splitter includes a Y-waveguide beam splitter.

* * * * *